(12) United States Patent
Johnston et al.

(10) Patent No.: US 11,785,334 B2
(45) Date of Patent: Oct. 10, 2023

(54) METHOD AND DEVICE FOR IMAGE FRAME SELECTION

(71) Applicant: Google LLC, Mountain View, CA (US)

(72) Inventors: Chorong Johnston, Mountain View, CA (US); John Oberbeck, Mountain View, CA (US); Mariia Sandrikova, Mountain View, CA (US)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 17/272,839

(22) PCT Filed: Sep. 24, 2018

(86) PCT No.: PCT/US2018/052501
§ 371 (c)(1),
(2) Date: Mar. 2, 2021

(87) PCT Pub. No.: WO2020/068044
PCT Pub. Date: Apr. 2, 2020

(65) Prior Publication Data
US 2021/0289132 A1 Sep. 16, 2021

(51) Int. Cl.
*H04N 23/60* (2023.01)
*H04N 23/62* (2023.01)
*H04N 5/262* (2006.01)

(52) U.S. Cl.
CPC .............. *H04N 23/64* (2023.01); *H04N 5/262* (2013.01); *H04N 23/62* (2023.01)

(58) Field of Classification Search
None
See application file for complete search history.

(56) References Cited

U.S. PATENT DOCUMENTS

| | | | | |
|---|---|---|---|---|
| 2009/0290037 | A1* | 11/2009 | Pore | H04N 23/64 348/222.1 |
| 2010/0262911 | A1* | 10/2010 | Kaplan | H04N 5/772 715/719 |
| 2016/0127641 | A1* | 5/2016 | Gove | H04N 5/23218 348/143 |
| 2016/0248992 | A1* | 8/2016 | Johansson | H04N 23/815 |
| 2017/0034444 | A1* | 2/2017 | Song | G11B 27/34 |
| 2017/0048461 | A1* | 2/2017 | Lee | H04N 5/232935 |

(Continued)

OTHER PUBLICATIONS

International Search Report and Written Opinion dated May 21, 2019 for International Application No. PCT/US2018/052501, 9 pages.

*Primary Examiner* — Cynthia Segura
(74) *Attorney, Agent, or Firm* — McDonnell Boehnen Hulbert & Berghoff LLP

(57) ABSTRACT

Method and device for image frame selection are provided. A computing device can receive, from an image capture device, a plurality of frames including a capture frame. The computing device can determine a computer-selected frame of the plurality of frames. The computing device can receive, by way of a user interface, a selection of an option to view the capture frame. The computing device can, responsive to receiving the selection, provide, by way of the user interface, an animation between the capture frame and the computer-selected frame. The animation includes an interpolation of one or more frames captured between the capture frame and the computer-selected frame.

20 Claims, 7 Drawing Sheets

(56) References Cited

U.S. PATENT DOCUMENTS

2018/0160031 A1* 6/2018 Hoshino ............ H04N 5/23216
2018/0241948 A1* 8/2018 Jang .................... G06F 3/04886
2022/0210305 A1* 6/2022 Feng ...................... H04N 23/62

* cited by examiner

710 Receive, from an image capture device, a plurality of frames including a capture frame 720 Determine a suggested frame of the plurality of frames 730 Receive, by way of a user interface, a selection of an option to view the capture frame 740 Responsive to receiving the selection, provide, by way of the user interface, an animation between the capture frame and the suggested frame, wherein the animation comprises an interpolation of one or more frames captured between the capture frame and the suggested frame

FIG. 7

METHOD AND DEVICE FOR IMAGE FRAME SELECTION

CROSS-REFERENCE TO RELATED APPLICATIONS

This application is a U.S. National Stage entry of International Patent Application no. PCT/US2018/052501, filed Sep. 24, 2018.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can obtain a plurality of images in rapid succession. For example, some image capture devices can obtain burst image data or create a micro video in response to receiving a selection of an option to capture an image. After the plurality of images has been captured, the images can be saved, displayed, transmitted, printed to paper, and/or otherwise utilized.

SUMMARY

In one aspect, a method is provided. The method includes receiving, from an image capture device, a plurality of frames including a capture frame. The method further includes determining a computer-selected frame of the plurality of frames. The method also includes receiving, by way of a user interface, a selection of an option to view the capture frame. The method additionally includes, responsive to receiving the selection, providing, by way of the user interface, an animation between the capture frame and the computer-selected frame. The animation includes an interpolation of one or more frames captured between the capture frame and the computer-selected frame.

In another aspect, a non-transitory computer readable medium is provided. The non-transitory computer readable medium has stored therein instructions executable by one or more processors to cause the one or more processors to perform functions. The functions include receiving, from an image capture device, a plurality of frames including a capture frame. The functions further include determining a computer-selected frame of the plurality of frames. The functions also include receiving, by way of a user interface, a selection of an option to view the capture frame. The functions additionally include, responsive to receiving the selection, providing, by way of the user interface, an animation between the capture frame and the computer-selected frame. The animation includes an interpolation of one or more frames captured between the capture frame and the computer-selected frame.

In another aspect, a computing device is provided. The computing device includes at least one processor, an image capture device, and a non-transitory computer readable medium. The non-transitory computer readable medium has stored therein instructions executable by the at least one processor to cause the at least one processor to perform functions. The functions include receiving, from an image capture device, a plurality of frames including a capture frame. The functions further include determining a computer-selected frame of the plurality of frames. The functions also include receiving, by way of a user interface, a selection of an option to view the capture frame. The functions additionally include, responsive to receiving the selection, providing, by way of the user interface, an animation between the capture frame and the computer-selected frame. The animation includes an interpolation of one or more frames captured between the capture frame and the computer-selected frame.

In another aspect, a system is provided. The system includes means for receiving a plurality of frames including a capture frame. The system further includes means for determining a computer-selected frame of the plurality of frames. The system also includes means for receiving a selection of an option to view the capture frame. The system additionally includes means for responsive to receiving the selection, providing an animation between the capture frame and the computer-selected frame. The animation includes an interpolation of one or more frames captured between the capture frame and the computer-selected frame.

In another aspect, an article of manufacture is provided. The article of manufacture includes one or more computer readable media having computer-readable instructions stored thereon that, when executed by one or more processors of a computing device, cause the computing device to carry out functions. The functions include receiving, from an image capture device, a plurality of frames including a capture frame. The functions further include determining a computer-selected frame of the plurality of frames. The functions also include receiving, by way of a user interface, a selection of an option to view the capture frame. The functions additionally include, responsive to receiving the selection, providing, by way of the user interface, an animation between the capture frame and the computer-selected frame. The animation includes an interpolation of one or more frames captured between the capture frame and the computer-selected frame.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 7 is a flowchart of a method, in accordance with an example embodiment.

DETAILED DESCRIPTION

I. Overview

Figure 1:
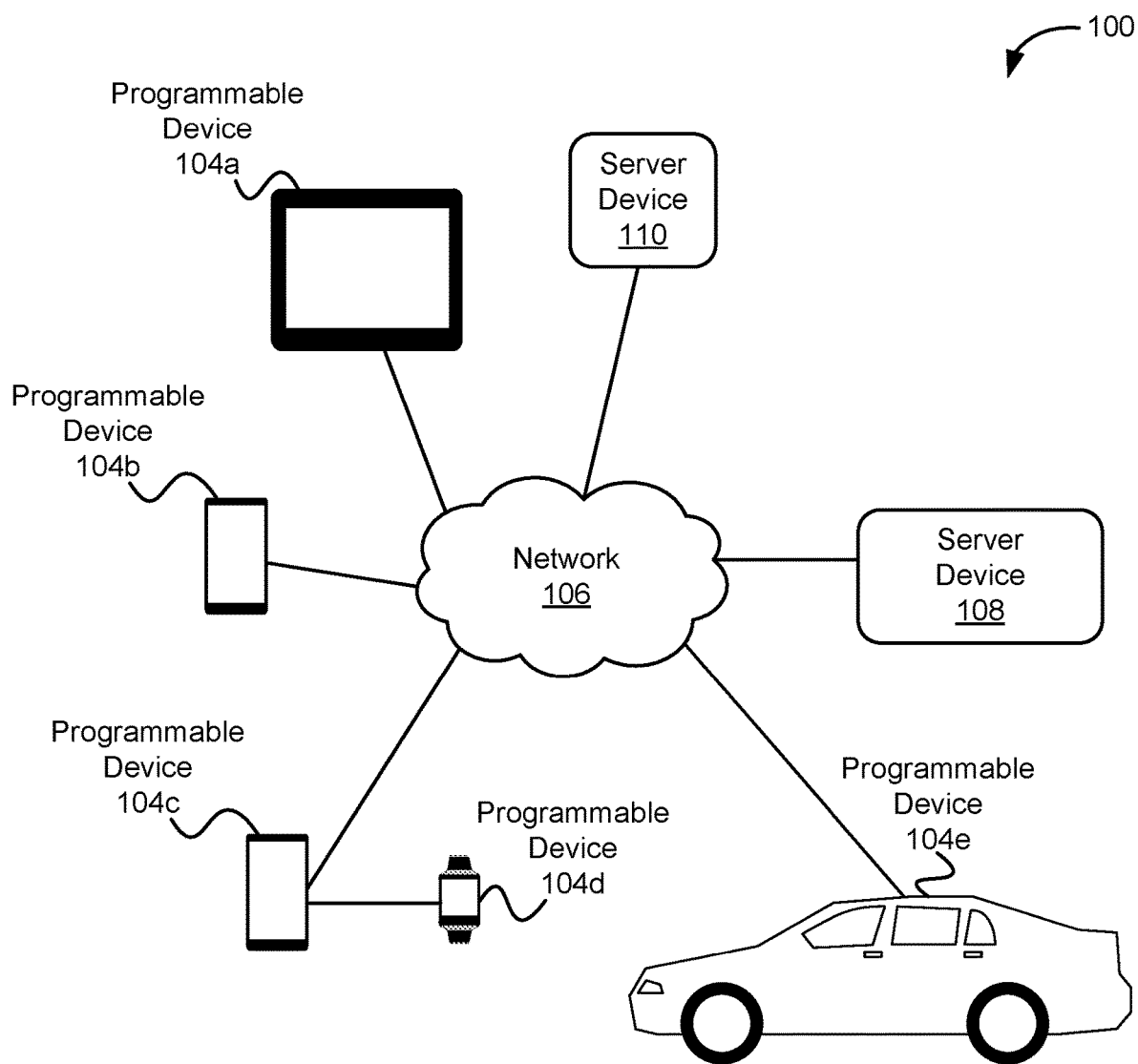
FIG. 1 depicts a distributed computing architecture, in accordance with an example embodiment.

Computing devices may permit a user to select an option to capture an image by way of a user interface. Upon receiving such a selection, the computing device may capture a plurality of frames, which can allow for high-dynamic range imaging, creation of a micro video, image denoising, or other operations. Of these frames, one in particular might correspond to a user selection. For instance, one frame might be captured at substantially the same time that an image capture option is selected by way of a user interface. Such a frame may be referred to as a capture frame.

In some instances, a user might determine that the capture frame is unsuitable for editing, sharing, or other options. For example, the capture frame might be blurry, poorly exposed, or mistimed. Capturing a plurality of frames may resolve these issues by allowing a user to select another frame that the user feels is more suitable for editing, sharing, or otherwise. A computing device can further assist the user in finding a more suitable frame by providing one or more computer-selected frames. These computer-selected frames can be determined using a machine learning model that is trained using images from the computing device or from images captured by many computing devices.

Where computer-selected frames are provided to a user, the user might have difficulty determining the relationship between the capture frame and the computer-selected frame. In particular, the user might have difficulty determining the temporal relationship and the differences between the capture frame and the computer-selected frame.

The detailed description provided herein describes methods and devices for providing an animation between a captured frame and a computer-selected frame that may help to remedy the issues described above. In particular, such an animation allows a user to understand the temporal relationship and the differences between a capture frame and a computer-selected frame in order to allow the user to select a suitable frame for editing, sharing, or other operations.

Providing an animation between a capture frame and a computer-selected frame may involve receiving a plurality of frames from an image capture device. The plurality of frames might be captured in a burst mode of the image capture device, as part of a micro video associated with an application installed on a computing device, or as part of an automated procedure for generating a high-quality image. The plurality of frames may include a capture frame that is indicative of which frame a user intended to capture. The capture frame can be captured at substantially the same time that an image capture option is selected by a user, or a time at which the image capture option is first selected.

A computer-selected frame may be determined based on the plurality of frames. For instance, a computing device can receive the frames from the image capture device, send the frames to a server with a request for a computer-selected frame, and receive one or more computer-selected frames from the server. The computer-selected frame can be determined based on image quality (e.g. lighting, clarity, noise level, etc.), on characteristics of the scene (e.g. whether subjects are smiling, whether subjects are looking at the image capture device, whether a perceived action in the scene is complete, etc.), or other factors. In some examples, the server or computing device may determine the computer-selected frame using a machine learning model that is trained based on captured frames and on subsequent frame selection decisions of users. In other examples, the computing device may determine the computer-selected frame without use of a machine learning model. For example, the computing device may determine the computer-selected frame based on predetermined criteria for determining image quality or based on past image selections of a user. Other ways of determining the computer-selected image are possible.

After the plurality of images are captured, a user may select an option to view the capture frame. For instance, the user may open a virtual photograph gallery, or select a representation of the capture frame in order to edit or share the capture frame using a user interface of the computing device.

In response to receiving a selection of the option to view the capture frame, the computing device can provide an animation between the capture frame and the computer-selected frame by way of the user interface. In some examples, the computing device can provide the animation automatically. In alternative examples, providing the animation can be user-initiated. The animation can include an interpolation of frames captured between the capture frame and the computer-selected frame. In some instances, the interpolation may be non-linear. For example, the animation may decelerate from the capture frame to the computer-selected frame.

The computing device may also provide a timeline along with the animation that has a marker that scrolls as the animation plays out. In this fashion, the user can perceive a temporal relationship between the capture frame and the computer-selected frame.

After providing the animation, the computing device may provide an option to navigate away from the computer-selected frame using the user interface. For example, the computing device may provide a timeline along which the user can scroll to view a different frame. The user may interact with the same marker used to denote a temporal relationship between the capture frame and the computer-selected frame during the animation. Thus, providing the timeline during the animation may also serve to show a user how to interact with the timeline to navigate to other frames. The computing device may also provide multiple computer-selected frames, and allow the user to navigate to each computer-selected frame in turn. In such examples, a machine learning model used to determine the computer-selected frames may be trained based on which computer-selected frame is selected or based on a comparison of a computer-selected frame to a frame ultimately selected by a user.

With respect to embodiments that include determining a computer-selected frame using a machine learning model, interactions by the computing device with cloud-based servers, or otherwise involve sharing captured images with other computing devices, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

II. Example Data Network

FIG. 1 depicts a distributed computing architecture 100, in accordance with an example embodiment. Distributed computing architecture 100 can include server devices 108, 110 configured to communicate, via network 106, with programmable devices 104a, 104b, 104c, 104d, 104e. Network 106 may correspond to a LAN, a wide area network (WAN), a corporate intranet, the public Internet, or any other type of network configured to provide a communications path between networked computing devices. Network 106 may also correspond to a combination of one or more LANs, WANs, corporate intranets, and/or the public Internet.

Although FIG. 1 only shows five programmable devices, distributed application architectures may serve tens, hundreds, or thousands of programmable devices. Moreover, programmable devices 104a, 104b, 104c, 104d, 104e, (or any additional programmable devices) may be any sort of computing device, such as an ordinary laptop computer, desktop computer, wearable computing device, mobile computing device, head-mountable device, network terminal, wireless communication device (e.g., a smart phone or cell phone), and so on. In some embodiments, such as indicated with programmable devices 104a, 104b, 104c, programmable devices can be directly connected to network 106. In other embodiments, such as indicated with programmable device 104d, programmable devices can be indirectly connected to network 106 via an associated computing device, such as programmable device 104c. In this example, programmable device 104c can act as an associated computing device to pass electronic communications between programmable device 104d and network 106. In yet other embodiments, such as shown in programmable device 104e, a computing device can be part of and/or inside a vehicle; e.g., a car, a truck, a bus, a boat or ship, an airplane, etc. In still other embodiments not shown in FIG. 1, a programmable device can be both directly and indirectly connected to network 106.

Server devices 108, 110 can be configured to perform one or more services, as requested by programmable devices 104a-104e. For example, server device 108 and/or 110 can provide content to programmable devices 104a-104e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 108 and/or 110 can provide programmable devices 104a-104e with access to software for database, search, computation, graphical, audio, video, World Wide Web/Internet utilization, and/or other functions. Many other examples of server devices are possible as well.

III. Computing Device Architecture

Figure 2:
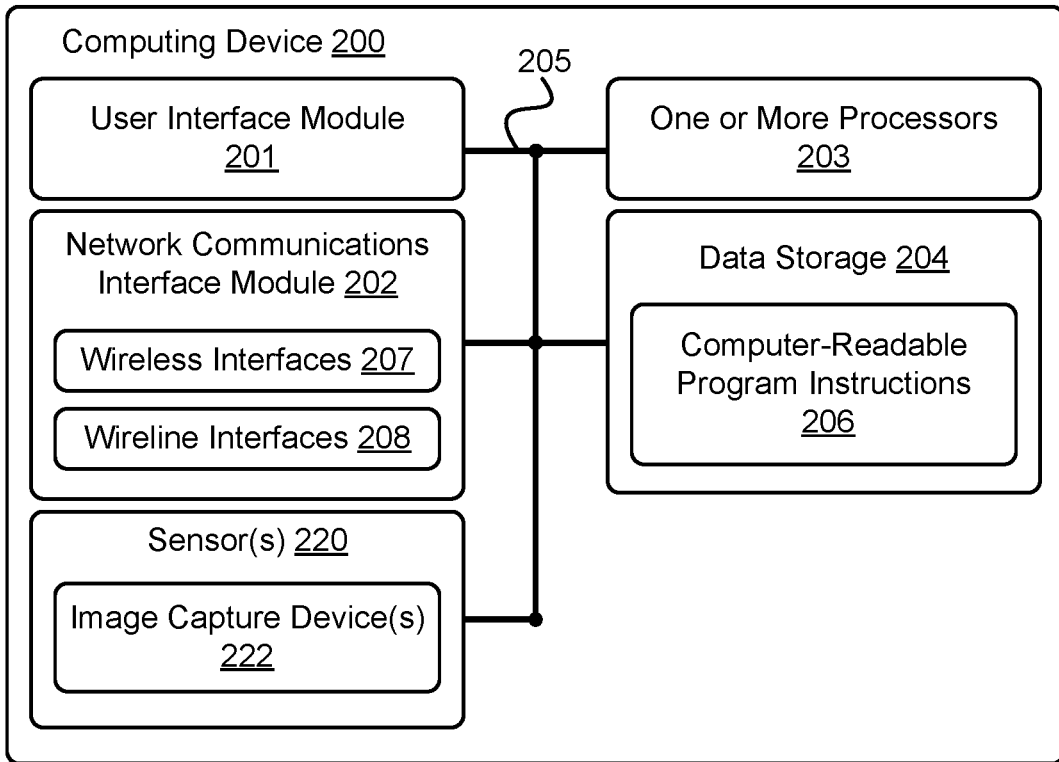
FIG. 2 is a functional block diagram of an example computing device, in accordance with an example embodiment.

FIG. 2 is a functional block diagram of an example computing device 200, in accordance with an example embodiment. In particular, computing device 200 shown in FIG. 2 can be configured to perform at least one function of distributed computing architecture 100, programmable devices 104a, 104b, 104c, 104d, 104e, network 106, and/or server devices 108, 110, computing devices 300, 400, and 500, and/or at least one function related to method 700.

Computing device 200 may include user interface module 201, network communications interface module 202, one or more processors 203, data storage 204, and one or more sensors 220, all of which may be linked together via a system bus, network, or other connection mechanism 1805.

User interface module 201 can be operable to send data to and/or receive data from external user input/output devices. For example, user interface module 201 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 201 can also be configured to generate audible outputs, such as a speaker, speaker jack, audio output port, audio output device, earphones, and/or other similar devices. User interface module 201 can further be configured with one or more haptic devices that can generate haptic outputs, such as vibrations and/or other outputs detectable by touch and/or physical contact with computing device 200. In some embodiments, user interface module 201 can be used to provide a graphical user interface for utilizing computing device 200.

Network communications interface module 202 can include one or more wireless interfaces 207 and/or one or more wireline interfaces 208 that are configurable to communicate via a network. Wireless interfaces 207 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 203 can include one or more general purpose processors, and/or one or more special purpose processors (e.g., digital signal processors, graphics processing units, application specific integrated circuits, etc.). One or more processors 203 can be configured to execute computer-readable program instructions 206 that are contained in data storage 204 and/or other instructions as described herein.

Data storage 204 can include one or more computer-readable storage media that can be read and/or accessed by at least one of one or more processors 203. The one or more computer-readable storage media can include volatile and/or non-volatile storage components, such as optical, magnetic, organic or other memory or disc storage, which can be integrated in whole or in part with at least one of one or more processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206 and perhaps additional data. In some embodiments, data storage 204 can additionally include storage required to perform at least part of the herein-described methods, scenarios, and techniques and/or at least part of the functionality of the herein-described devices and networks.

In some embodiments, computing device 200 can include one or more sensors 220. Sensors 220 can be configured to measure conditions in an environment of computing device 200 and provide data about that environment. For example, sensors 220 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (ii) sensors to measure locations and/or movements of computing device 200, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 200, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 200, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 220 are possible as well.

The sensors 220 can also include one or more image capture devices 222. The one or more image capture devices 222 may be configured to capture a plurality of images in rapid succession. For instance, computing device 200 may receive a selection of an option to capture an image by way of user interface module 201, and may responsively capture a plurality of images using one or more image capture devices 222. The plurality of images may be referred to as a plurality of frames, and may take the form of burst image data, a micro video, or another collection of images.

Figure 3:
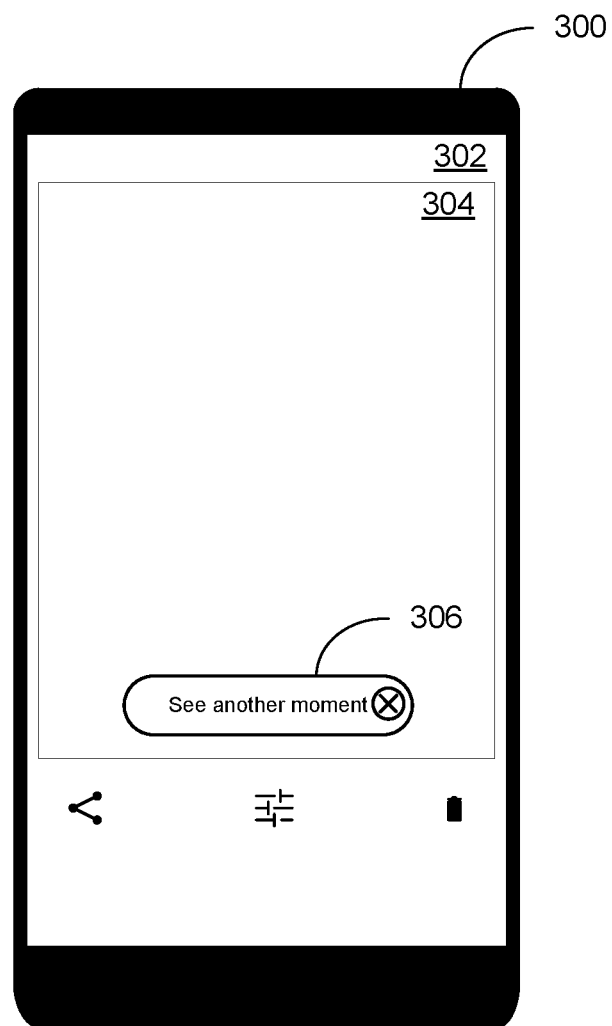
FIG. 3 shows a computing device providing a capture frame, in accordance with an example embodiment.

IV. Providing an Animation between a Capture Frame and a Computer-selected Frame FIG. 3 shows a computing device 300 that is providing a capture frame. Computing device 300 includes a user interface 302. User interface 302 provides an image 304, and an option 306 to see another frame.

Computing device 300 may be configured in much the same fashion described above with respect to computing device 200, and may operate similarly to programmable devices 104a, 104b, 104c, 104d, and 104e in a network context. Though computing device 300 is depicted as a mobile computing device, the forthcoming description can apply to other types of devices as well.

Computing device 300 may provide image 304 responsive to an image capture device capturing a plurality of images. For example, computing device 300 may receive a selection of an option to take a photograph by way of an interaction with user interface 302. Image 304 may be an image that is captured at substantially the same time that the selection is received. Accordingly, image 304 may be referred as a capture frame of a plurality of frames.

Subsequent to capturing image 304, computing device 300 may provide, by way of user interface 302, a representation of image 304, as well as options related to image 304. In the present example, options to share, edit, or delete image 304 are presented, though other options are possible. In addition, user interface 302 provides an option 306 to "see another moment."

Interacting with option 306 may prompt computing device 300 to determine a computer-selected frame. In other examples, the computer-selected frame might be determined by computing device 300 automatically each time a plurality of images are captured in rapid succession by an image capture device associated with computing device 300.

Determining a computer-selected frame may be performed by one or more processors executing program instructions stored on computing device 300. In other examples, determining the computer-selected frame can include sending a request for a computer-selected frame to a server, such as server 106, along with a plurality of frames. The server can be a cloud-based server that compiles images received from computing device 300 and/or images received from other computing devices.

Computing device 300, the server, or another device may weigh characteristics of each image in the plurality of images to determine a computer-selected frame. In other examples, the computer-selected frame may be determined using a machine learning model that is trained based on images received from computing device 300 and other computing devices.

In some examples, computing device 300 may determine the computer-selected frame based on predetermined criteria for measuring quality of a frame. For example, computing device 300 can assign a score to each frame in the plurality of frames based on the criteria, and determine the computer-selected frame by comparing respective scores each frame. In some examples, the criteria can be weighted based on preferences selected by a user. In other examples, computing device 300, a server, or another computing device may track selections of frames to determine the user preferences. Accordingly, in some embodiments determining the computer-selected frame may be performed based on one or more prior user actions.

In some examples, computing device 300 may determine a plurality of computer-selected frames, and may rank them. For example, computing device 300 may determine a primary computer-selected frame that is determined most likely to be suitable for selection, a secondary computer-selected frame that is next most likely to be suitable for selection, and so on. After receiving selection of option 306 to view a computer-selected frame, computing device may present, by way of user interface 302, a representation of the capture frame and the one or more computer-selected frames.

Figure 4:
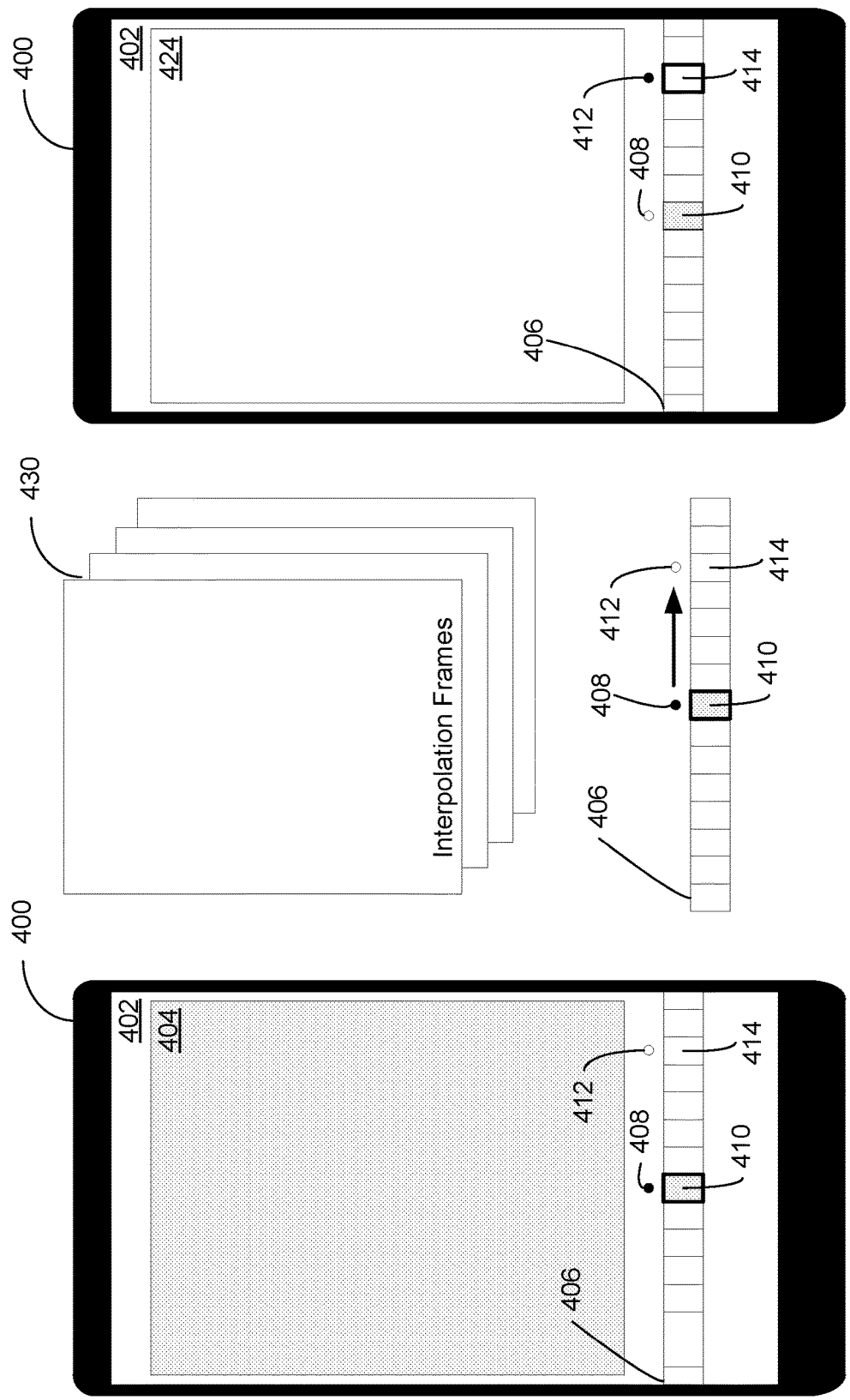
FIG. 4 depicts an animation between a capture frame and a computer-selected frame, in accordance with an example embodiment.

FIG. 4 depicts an animation between a capture frame 404 and a computer-selected frame 424, in accordance with an example embodiment. Computing device 400 includes user interface 402. User interface 402 is used to provide an animation between capture frame 404 and computer-selected frame 424. The present example depicts a first time during the animation at which capture frame 404 is shown, a second time at which computer-selected frame 424 is shown, and a representation of an animation provided between the first time and the second time.

User interface 402 also provides a timeline 406 that can be used to establish a temporal relationship between capture frame 404 and computer-selected frame 424. Timeline 406 may include a plurality of snapshots of the plurality of images that show a thumbnail view of the captured scene at a time that corresponds to the snapshot. Timeline 406 may further include one or more indicators denoting snapshots that correspond to significant frames, such as the capture frame or a computer-selected frame. In the present example, indicator 408 is associated with snapshot 410, which provides a thumbnail view of capture frame 404. Additionally, indicator 412 is associated with snapshot 414, which provides a thumbnail view of a computer-selected frame.

The snapshots provided in timeline 406 are can be representative of frames used in the animation. The animation involves displaying frames captured between capture frame 404 and computer-selected frame 424. Such frames can be referred to as interpolation frames. In some examples, the interpolation frames can include each frame captured between capture frame 404 and computer-selected frame 424. In other examples, the interpolation frames can be sampled such that only a portion of captured frames are used in the animation. In still other examples, additional frames may be generated based on the captured frames.

In the present example, four snapshots separate snapshot 410 and snapshot 414. Accordingly, FIG. 4 depicts four interpolation frames 430 used to animate from capture frame 404 to computer-selected frame 424. Though four interpolation frames 430 are depicted in FIG. 4 to correspond to the snapshots in timeline 406, it should be understood that several interpolation frames can correspond to a single representative snapshot.

The animation may help to illustrate differences between capture frame 404 and computer-selected frame 424. For instance, where the captured scene is landscape, the animation might show that capture frame 404 is blurred and that computer-selected frame 424 is clearer. Where the scene includes a portrait, the animation may show that subjects of the portrait are not smiling in capture frame 404 and that all subjects are smiling in computer-selected frame 424. Where the scene includes an action, the animation may show that capture frame 404 depicts a less interesting portion of the action and that computer-selected frame 424 depicts a more interesting portion of the action. Other types of scenes and animations are possible.

In FIG. 4, timeline 406 shows that a computer-selected frame was captured after capture frame 404, which in turn indicates that the computer-selected frame was captured after a selection of an option to capture an image. Timeline 406 also depicts frames that are captured prior to capture frame 404. In such examples, an application associated with an image capture device that captured capture frame 404 may cause the image capture device to continuously capture images while awaiting a selection to capture an image. In this fashion, the plurality of frames can include frames captured prior to the capture frame and frames captured after the capture frame. In other examples the plurality of frames may only include frames captured after the capture frame.

In some examples, concurrently with the animation, a marker on timeline 406 is adjusted to indicate a temporal relationship between the capture frame and the computer-selected frame. For example, different snapshots of timeline 406 can be highlighted to serve as a marker that denotes the passage of time. In other examples, a bar may pass across timeline 406 to serve as the marker. Other types of markers can be used with a timeline to depict a temporal relationship between different frames.

Once user interface 402 provides the animation, which ends with computer-selected frame 424, an option may be provided to interact with the computer-selected frame, or to view another frame of the plurality of frames. For instance, to share or edit computer-selected frame 424, a user may simply touch the portion of user interface 402 that depicts computer-selected frame 424. A user can also interact with timeline 406 to navigate to another frame. In other examples, more than one computer-selected frame may be provided, and user interface 402 may provide a selectable option to view additional computer-selected frames. Other options to interact with computer-selected frame 424 or view another frame are possible as well.

In examples where a machine learning model is used to determine computer-selected frames, a selection of an option to navigate from computer-selected frame 424 to another frame, or a selection of an option to interact with computer-selected frame 424, can be used to train the machine learning model. For instance, selecting computer-selected frame 424 may indicate that the machine learning model computer-selected a suitable frame, while selecting an option to navigate to another frame, and ultimately selecting another frame, may indicate that the machine learning model did not suggest a suitable frame.

Figure 5:
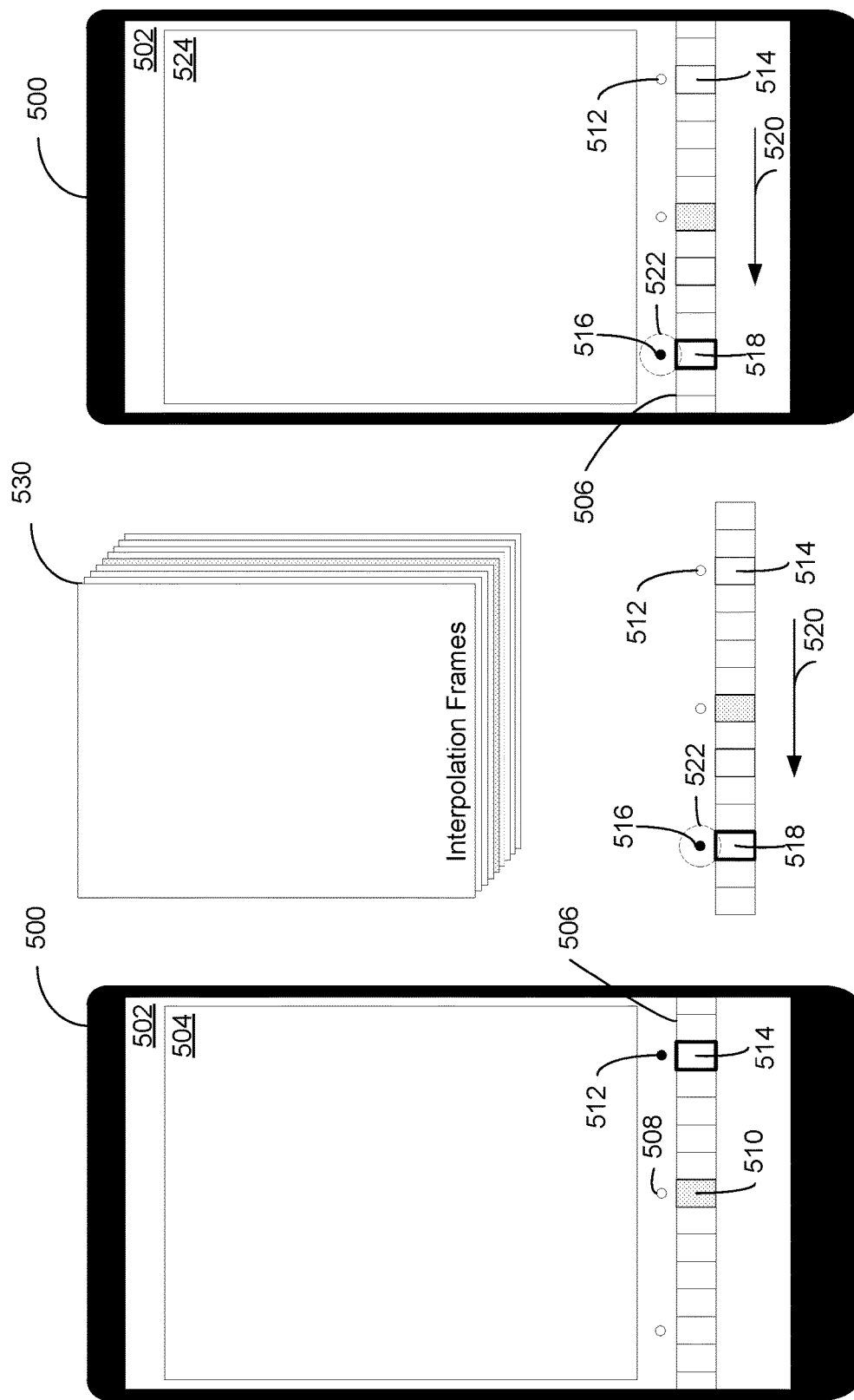
FIG. 5 depicts an animation between a first computer-selected frame and a second computer-selected frame, in accordance with an example embodiment.

FIG. 5 depicts an animation between a first computer-selected frame 504 and a second computer-selected frame 524, in accordance with an example embodiment. Computing device 500 includes user interface 502. User interface 502 provides first computer-selected frame 504. User interface 502 further includes a timeline 506. Timeline 506 includes indicators 508 and 512 which respectively correspond to a snapshot 510 of a capture frame and a snapshot 514 of first computer-selected frame 504. The present example depicts a first time during the animation at which first computer-selected frame 504 is shown, a second time at which computer-selected frame 524 is shown, and a representation of an animation provided between the first time and the second time.

FIG. 5 depicts user interface 502 after an animation from a capture frame to first computer-selected frame 504 has already occurred. User interface 502 may include an option to perform an action associated with first computer-selected frame 504. For instance, an option may be presented to share or edit first computer-selected frame 504. Further, an option to navigate to another frame, such as a second computer-selected frame, may be presented by way of user interface 502.

Similar to the animation depicted in FIG. 4, FIG. 5 depicts an animation interpolating between first computer-selected frame 504 and second computer-selected frame 524. In particular, interpolation frame 530 correspond to frames captured between first computer-selected frame 504 and second computer-selected frame 524.

FIG. 5 also shows an interaction 520 that causes user interface 502 to scroll through the plurality of frames towards second computer-selected frame 524. Interaction

520, might be, for example, a swipe across a screen of computing device 500. Second computer-selected frame 524 may be associated with a snap radius 522 that causes user interface 502 to show second computer-selected frame 524 once a threshold level of proximity is reached between a current frame shown by user interface 502 and second computer-selected frame 524. For example, a user may scroll across timeline 506 until snap radius 522 is reached. In response to receiving an indication that interaction 520 has reached snap radius 522, computing timeline 506 may cause user interface 502 to move timeline 506 to snapshot 518, and provide second computer-selected frame 524. Computing device 500 may animate between frames as a user scrolls through timeline 506.

Though FIG. 5 shows an animation between first computer-selected frame 504 and second computer-selected frame 524 being provided in response to interaction 520, such an animation may occur automatically. For example, the computer-selected frames may be ranked. In such examples, first computer-selected frame 504 might be a primary computer-selected frame and second computer-selected frame 524 might be a secondary computer-selected frame. Computing device 500 may provide an animation that depicts the differences between a capture frame and the primary frame, between the primary frame and the secondary frame, and so on. The ranked computer-selected frames might be determined using a machine learning model that is trained based on images received from computing device 500 and other computing devices. In such examples, the machine learning model can be trained based on which of the computer-selected frames, if any, is selected, and/or based on a comparison of the computer-selected frames.

Figure 6:
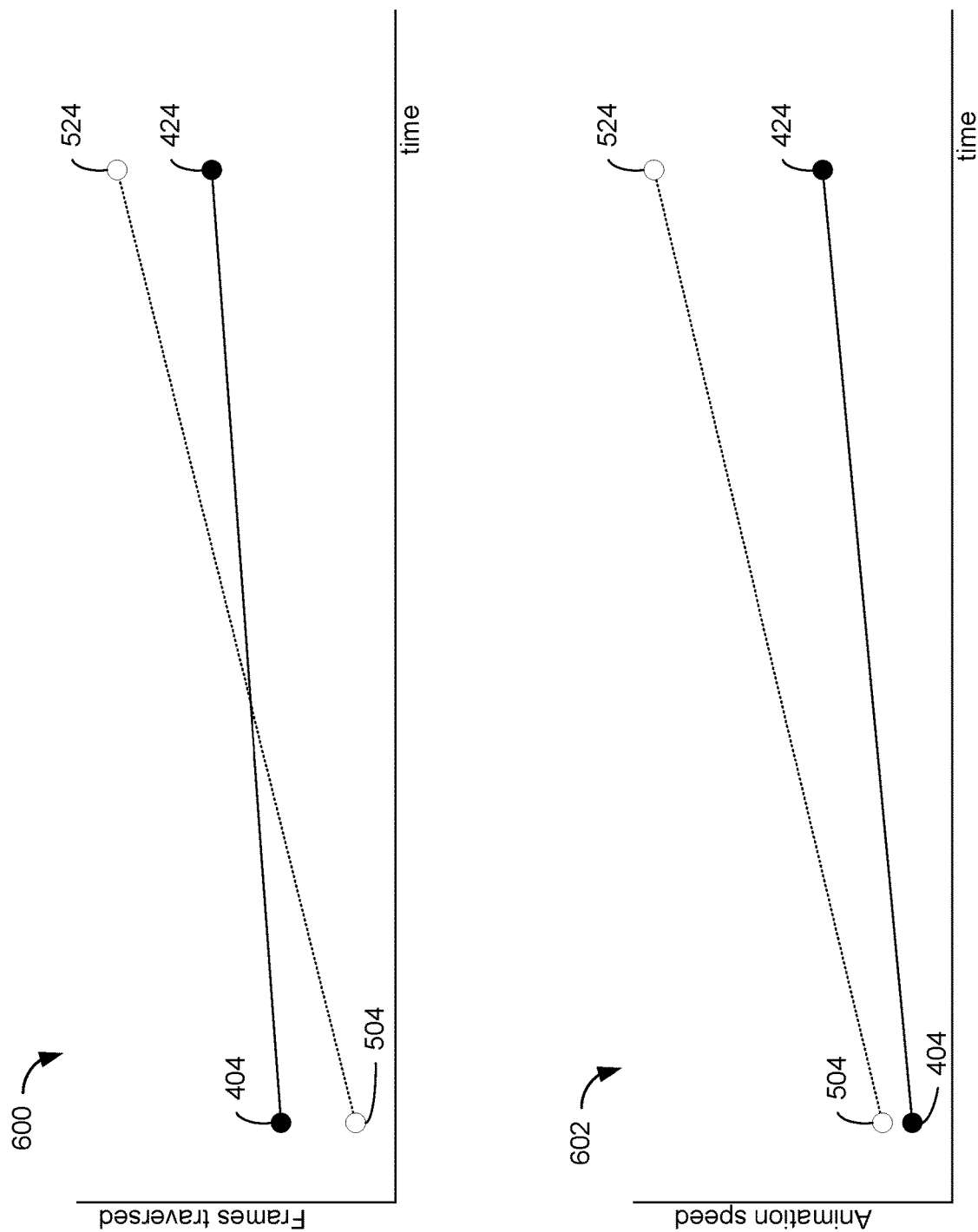
FIG. 6 depicts interpolation characteristics of an animation, in accordance with an example embodiment.

FIG. 6 depicts interpolation characteristics of an animation, in accordance with an example embodiment. FIG. 6 includes exemplary graphs 600 and 602. Graph 600 depicts frames traversed in the animation versus time of the animation and graph 602 depicts interpolation distance between animation frames versus time of the animation.

Interpolating between two frames of the plurality of frames, such as a capture frame and a computer-selected frame, can involve displaying each frame captured between the capture frame and the computer-selected frame. In some examples, interpolating between the frames can involve sampling select frames within the plurality, and in some instances may involve generating additional frames for the animation based on characteristics of the captured frames in the plurality.

In some embodiments, the animation time will remain the same for all animations, regardless of the number of frames that separate a pair of frames that begin and end the animation. Using the scenarios presented in FIG. 4 and FIG. 5 as an example, graph 600 shows that capture frame 404 and computer-selected frame 424 are separated by fewer frames than those that separate first computer-selected frame 504 and second computer-selected frame 524. In other words, there are fewer frames traversed in the animation depicted in FIG. 4 than there are in the animation depicted in FIG. 5. However, graph 600 depicts their animation time as being substantially identical.

Interpolating between frames may be non-linear. For example, different frames may be displayed for different periods of time such that an animation appears to accelerate or decelerate as the animation approaches an ending frame. In examples where interpolating frames includes sampling frames captured between a capture frame and a computer-selected frame, non-linear interpolation involves changing the number of frames skipped between sampled frames used in the animation may change as the animation approaches the last frame.

In some examples, this change in time periods for displaying different frames, or change to numbers of skipped frames, may differ between animations. Using the scenarios presented in FIGS. 4 and 5 as an example, graph 602 shows that the animation between capture frame 404 and computer-selected frame 424 progresses more slowly than the animation between first computer-selected frame 504 and second computer-selected frame 524. Because both depicted animations take the same time to conclude, and because the animation between first computer-selected frame 504 and second computer-selected frame 524 traverses more captured frames than that between capture frame 404 and computer-selected frame 424, the former shows a greater animation speed.

Graph 602 also shows that the depicted animations accelerate toward the last frame. In other words, as the animation progresses, the animation approaches the last frame more quickly. This acceleration is more pronounced where more frames separate the first frame and the last frame in an animation. For example, first computer-selected frame 504 accelerates more quickly towards second computer-selected frame 524 than capture frame 404 accelerates towards computer-selected frame 424 within the respective animations depicted in FIGS. 5 and 4.

Though graphs 600 and 602 depict a particular way of interpolating frames for an animation, other types of interpolation are possible. For instance, interpolation can take different times depending on the number of traversed frames in a given animation, can include uniform accelerations across all animations, or can be linear rather than non-linear. These different ways of interpolating frames may vary based on context as well. For example, an animation between a capture frame and a computer-selected frame have the characteristics depicted in graphs 600 and 602, while animating between frames as a user scrolls through a timeline, such as timeline 406 or 506, may depend on how quickly the user scrolls. Other context-based changes in interpolation are possible as well.

V. Example Methods of Operation

FIG. 7 is a flowchart of a method, in accordance with an example embodiment. Method 700 can be a computer-implemented method. For example, method 700 can be executed by a computing device, such as computing device 200, 300, 400, or 500.

FIG. 7 shows that method 700 can begin at block 710. Block 710 can be performed to receive, from an image capture device, a plurality of frames including a capture frame. For example, method 700 may further include receiving, at a capture selection time, by way of a user interface, a selection of an image capture option. The capture frame can be associated with the capture selection time. In such examples, the plurality of frames can include one or more frames captured prior to the capture selection time and one or more frames captured after the capture selection time.

Method 700 may further include block 720. Block 720 can be performed to determine a computer-selected frame of the plurality of frames. For instance, the computer-selected frame may be determined using a machine learning model. The machine learning model can be trained based on images captured from the image capture device, or from a plurality of image capture devices. Determining the computer-selected frame can include, responsive to receiving the plurality of frames, sending, to a server, the plurality of frames and a request to receive one or more computer-selected frames from the server. Determining the computer-selected frame may also include receiving an indication of the computer-selected frame from the server.

In some examples where block 720 is performed to determine a computer-selected frame using a machine learning model, method 700 may further include receiving, by way of the user interface, a selection of the computer-selected frame, and training the machine learning model based on the received selection.

Method 700 may further include block 730. Block 730 can be performed to receive, by way of a user interface, a selection of an option to view the capture frame. The option to view the capture frame can include an option to edit the capture frame.

Method 700 may further include block 740. Block 740 can be performed to, responsive to receiving the selection, provide, by way of the user interface, an animation between the capture frame and the computer-selected frame. The animation may include an interpolation of one or more frames captured between the capture frame and the computer-selected frame.

Providing the animation can further include providing a timeline of the plurality of frames. Concurrently with the interpolation of one or more frames, a marker on the timeline can be adjusted to indicate a temporal relationship between the capture frame and the computer-selected frame.

The interpolation of the one or more frames can be non-linear. For example, the non-linear interpolation might be performed such that the animation accelerates from the capture frame to the computer-selected frame.

Method 700 may additionally include, after providing the animation, provide, by way of the user interface, an option to navigate from the computer-selected frame to select a frame from the plurality of frames.

Method 700 can further include, responsive to receiving the selection of the option to view the capture frame, providing, by way of the user interface, a still image of the capture frame. Method 700 may also include providing, with the still image of the capture frame, an option to view the computer-selected frame and receiving, by way of the user interface, a selection of the option to view the computer-selected frame. Providing the animation can be performed responsive to receiving the selection of the option to view the computer-selected frame.

In some examples, method 700 may include determining a plurality of computer-selected frames. In such examples, the computer-selected frame can be a primary computer-selected frame, and method 700 can further include further determining a secondary computer-selected frame. In such examples, after providing the animation, method 700 can include providing, by way of the user interface, an option to navigate from the primary computer-selected frame to select the secondary computer-selected frame. The primary computer-selected frame and the secondary computer-selected frame can be determined using a machine learning model.

In examples where method 700 includes determining a plurality of computer-selected frames using a machine learning model, method 700 may further include receiving, by way of the user interface, a selection of the option to navigate from the primary computer-selected frame to select the secondary computer-selected frame, and training the machine learning model based on the received selection. In other such examples, method 700 can further include receiving, by way of the user interface, a selection of the option to navigate from the primary computer-selected frame to select the secondary computer-selected frame, and receiving, by way of the user interface, a selection of the secondary computer-selected frame. Further method 700 may include, responsive to receiving the selection of the secondary computer-selected frame, training the machine learning model based on a comparison of the secondary computer-selected frame and the primary computer-selected frame.

In examples where the computer-selected frame is determined using a machine learning model, method 700 may further include, receiving, by way of the user interface, a selection of the option to navigate from the computer-selected frame to select a frame from the plurality of frames, and receiving, by way of the user interface, a selection of a selected frame from the plurality of frames. In addition, method 700 can include, responsive to receiving the selection, providing, by way of the user interface, an option to perform an action related to the selected frame. Further method 700 may include training the machine learning model based on a comparison of the selected frame and the computer-selected frame.

In some examples, a computing device can be provided, where the computing device includes: one or more processors; and one or more computer readable media. The one or more computer readable media can have computer-readable instructions stored thereon that, when executed by the one or more processors, cause the computing device to carry out functions that include method 700.

In other examples, a computing device can be provided, where the computing device includes means for carrying out method 700.

In even other examples, an article of manufacture can be provided. The article of manufacture can include one or more computer readable media having computer-readable instructions stored thereon that, when executed by one or more processors of a computing device, cause the computing device to carry out functions that include method 700. In some of these examples, the one or more computer readable media can include one or more non-transitory computer readable media.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

Variations of the above referenced approach will be apparent to the skilled person. For example, while the above description provides particular disclosure of corrections to distortion of faces in an image, the approach may also be applied to other regions or objects of interest. As such, where the adjective "facial" is referred to in the above disclosure (such as in the phrases "facial regions" or "facial transformation"), the skilled person will appreciate that alternative approaches may be adopted in which such an adjective is not required. Similarly, references to "face-related costs", "face-related transformations" or other "face-related" features may be more generally considered as "object-related" or "region-related" in alternative implementations.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method comprising:
   receiving, from an image capture device, a plurality of frames including a capture frame;
   determining a computer-selected frame of the plurality of frames;
   receiving, by way of a user interface, a selection of an option to view the capture frame; and
   responsive to receiving the selection, providing, by way of the user interface, an animation between the capture frame and the computer-selected frame, wherein the animation comprises an interpolation of one or more frames captured between the capture frame and the computer-selected frame.

2. The method of claim 1, further comprising, after providing the animation, providing, by way of the user interface, an option to navigate from the computer-selected frame to select a frame from the plurality of frames.

3. The method of claim 1, further comprising receiving, at a capture selection time, by way of the user interface, a selection of an image capture option, wherein the capture frame is associated with the capture selection time, wherein the plurality of frames comprises one or more frames captured prior to the capture selection time and one or more frames captured after the capture selection time.

4. The method of claim 1, wherein the computer-selected frame is determined using a machine learning model trained based on images captured from a plurality of image capture devices.

5. The method of claim 1, wherein determining the computer-selected frame comprises:
   responsive to receiving the plurality of frames, sending, to a server, (i) the plurality of frames and (ii) a request to receive one or more computer-selected frames from the server; and
   receiving an indication of the computer-selected frame from the server.

6. The method of claim 1, wherein providing the animation further comprises providing a timeline of the plurality of frames, wherein, concurrently with the interpolation of one or more frames, a marker on the timeline is adjusted to indicate a temporal relationship between the capture frame and the computer-selected frame.

7. The method of claim 1, further comprising:
   responsive to receiving the selection of the option to view the capture frame, providing, by way of the user interface, a still image of the capture frame;
   providing, with the still image of the capture frame, an option to view the computer-selected frame; and
   receiving, by way of the user interface, a selection of the option to view the computer-selected frame, wherein providing the animation is performed responsive to receiving the selection of the option to view the computer-selected frame.

8. The method of claim 1, wherein the option to view the capture frame comprises an option to edit the capture frame.

9. The method of claim 1, wherein the interpolation of the one or more frames is non-linear.

10. The method of claim 9, wherein the non-linear interpolation is performed such that the animation accelerates from the capture frame to the computer-selected frame.

11. The method of claim 1, wherein the computer-selected frame is determined using a machine learning model, the method further comprising:
    receiving, by way of the user interface, a selection of the computer-selected frame; and
    training the machine learning model based on the received selection.

12. The method of claim 1, wherein the computer-selected frame is a primary computer-selected frame, the method further comprising:
    determining a secondary computer-selected frame; and
    after providing the animation, providing, by way of the user interface, an option to navigate from the primary computer-selected frame to select the secondary computer-selected frame.

13. The method of claim 12, wherein the primary computer-selected frame and the secondary computer-selected frame are determined using a machine learning model, the method further comprising:
- receiving, by way of the user interface, a selection of the option to navigate from the primary computer-selected frame to select the secondary computer-selected frame; and
- training the machine learning model based on the received selection.

14. The method of claim 12, wherein the primary computer-selected frame and the secondary computer-selected frame are determined using a machine learning model, the method further comprising:
- receiving, by way of the user interface, a selection of the option to navigate from the primary computer-selected frame to select the secondary computer-selected frame;
- receiving, by way of the user interface, a selection of the secondary computer-selected frame; and
- responsive to receiving the selection of the secondary computer-selected frame, training the machine learning model based on a comparison of the secondary computer-selected frame and the primary computer-selected frame.

15. The method of claim 1, further comprising:
- receiving, by way of the user interface, a selection of the option to navigate from the computer-selected frame to select a frame from the plurality of frames;
- receiving, by way of the user interface, a selection of a selected frame from the plurality of frames; and
- responsive to receiving the selection, providing, by way of the user interface, an option to perform an action related to the selected frame.

16. The method of claim 15, wherein the computer-selected frame is determined using a machine learning model, the method further comprising:
- training the machine learning model based on a comparison of the selected frame and the computer-selected frame.

17. A non-transitory computer readable medium having stored therein instructions executable by one or more processors to cause the one or more processors to perform functions comprising:
- receiving, from an image capture device, a plurality of frames including a capture frame;
- determining a computer-selected frame of the plurality of frames;
- receiving, by way of a user interface, a selection of an option to view the capture frame; and
- responsive to receiving the selection, providing, by way of the user interface, an animation between the capture frame and the computer-selected frame, wherein the animation comprises an interpolation of one or more frames captured between the capture frame and the computer-selected frame.

18. The non-transitory computer readable medium of claim 17, wherein determining the computer-selected frame comprises:
- responsive to receiving the plurality of frames, sending, to a server, (i) the plurality of frames and (ii) a request to receive one or more computer-selected frames from the server; and
- receiving an indication of the computer-selected frame from the server.

19. The non-transitory computer readable medium of claim 17, wherein the computer-selected frame is determined using a machine learning model, the functions further comprising:
- receiving, by way of the user interface, a selection of the option to navigate from the computer-selected frame to select a frame from the plurality of frames;
- receiving, by way of the user interface, a selection of a selected frame from the plurality of frames; and
- training the machine learning model based on a comparison of the selected frame and the computer-selected frame.

20. A computing device comprising:
- at least one processor;
- an image capture device; and
- a non-transitory computer readable medium having stored therein instructions, that when executed by the at least one processor, cause the at least one processor to perform functions comprising:
  - receiving, from the image capture device, a plurality of frames including a capture frame;
  - determining a computer-selected frame of the plurality of frames;
  - receiving, by way of a user interface, a selection of an option to view the capture frame;
  - responsive to receiving the selection, providing, by way of the user interface, an animation between the capture frame and the computer-selected frame, wherein the animation comprises an interpolation of one or more frames captured between the capture frame and the computer-selected frame.

* * * * *